United States Patent [19]

Stelzer et al.

[11] Patent Number: 4,914,363

[45] Date of Patent: Apr. 3, 1990

[54] METHOD FOR CONTROLLING THE MOTION OF A MACHINE ELEMENT

[75] Inventors: Joerg Stelzer; Raimund Kram, both of Erlangen, Fed. Rep. of Germany

[73] Assignee: Siemens Aktiengesellschaft, Berlin & Munich, Fed. Rep. of Germany

[21] Appl. No.: 345,471

[22] Filed: Apr. 28, 1989

[30] Foreign Application Priority Data

May 3, 1988 [DE] Fed. Rep. of Germany ....... 3815030

[51] Int. Cl.$^4$ .............................................. G06F 15/46
[52] U.S. Cl. .................................. 318/568.1; 318/570; 318/571; 318/572; 364/513; 364/474.3
[58] Field of Search ..................... 364/474.02, 474.01, 364/474.11, 474.12, 474.22, 474.23, 474.29, 474.31, 474.3, 474.32; 318/560–637; 388/806

[56] References Cited

U.S. PATENT DOCUMENTS

| 3,727,191 | 4/1973 | McGee | 364/474.3 |
|---|---|---|---|
| 3,798,427 | 3/1974 | Conners | 318/570 |
| 3,893,616 | 7/1975 | Trousdale | 235/151 |
| 3,941,987 | 3/1976 | Tack, Jr. | 235/151.11 |
| 4,342,378 | 8/1982 | Hmelousky | 318/561 X |
| 4,554,497 | 11/1985 | Nozawa et al. | 318/571 X |
| 4,603,286 | 7/1986 | Sakano | 318/572 X |
| 4,652,804 | 3/1987 | Kawamura et al. | 318/590 |
| 4,706,003 | 11/1987 | Nakashima et al. | 318/636 X |
| 4,728,872 | 3/1988 | Kishi et al. | 318/567 X |
| 4,815,007 | 3/1989 | Sakai et al. | 364/513 |

Primary Examiner—William M. Shoop, Jr.
Assistant Examiner—Paul Ip
Attorney, Agent, or Firm—Kenyon & Kenyon

[57] ABSTRACT

To avoid variation between the resultant paths of multiaxis motions of a machine element for different override curves, distance-time curves of the axis motions are stored for an override value of 100%, and a relevant distance-time curve is subjected, in synchronism with a time sequence of selectively varied override values for each axis, to a time expansion which is inversely proportional to the respective override value.

2 Claims, 2 Drawing Sheets

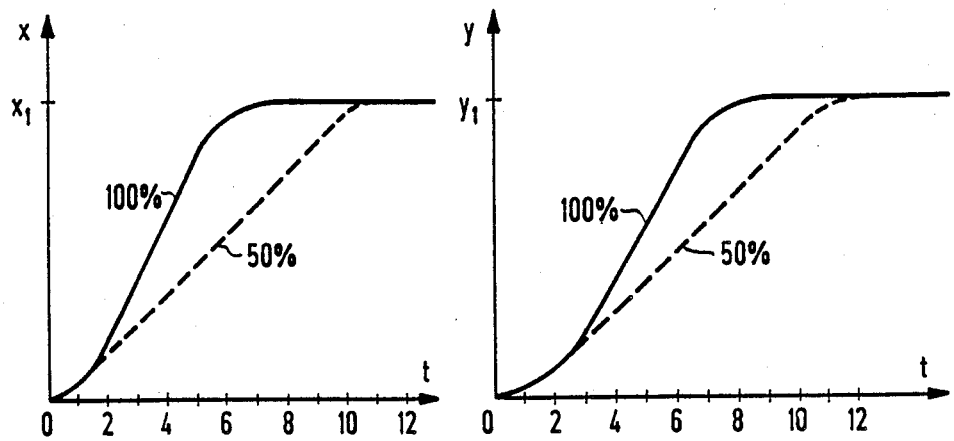
FIG 3 PRIOR ART
FIG 4 PRIOR ART
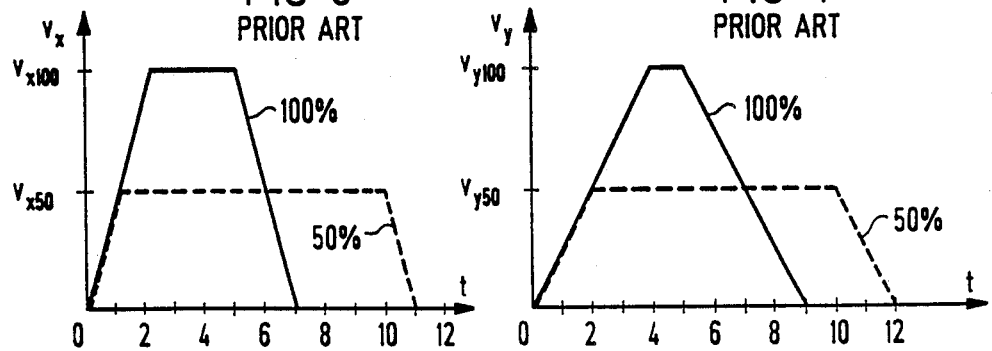
FIG 1 PRIOR ART
FIG 2 PRIOR ART
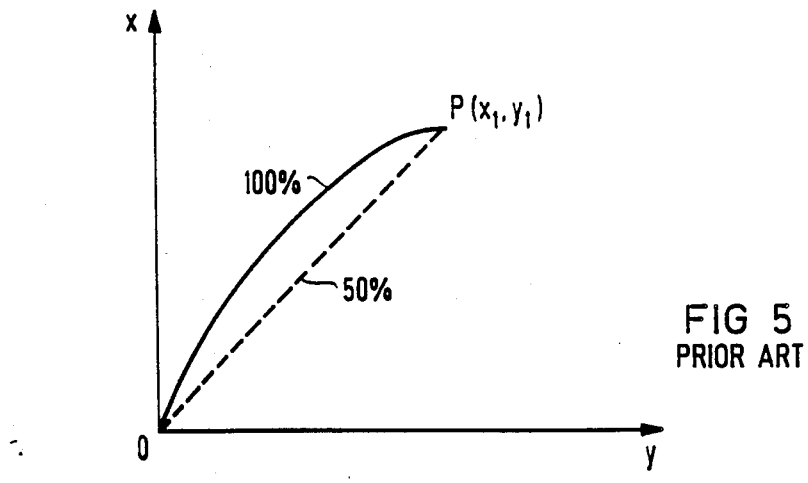
FIG 5 PRIOR ART

1

METHOD FOR CONTROLLING THE MOTION OF A MACHINE ELEMENT

BACKGROUND OF THE INVENTION

1. Field of the Invention

The invention relates to a method for controlling a resultant motion, consisting of component movements along a plurality of coordinate axes, of a machine element between two points in space in accordance with selectively variable override values (i.e., ratios of desired velocities of the machine element to a predetermined normal operating velocity of the element, the ratios preferably being expressed as percentages of the normal operating velocity).

2. Related Art

As a rule, movement of the tools of a machine tool or the hand of a robot involves movement along more than one coordinate axis; so that the resulting motion path is obtained from the superimposed individual motions. This complex motion is established by the program of the machine tool or by the numerical control unit controlling the robot, usually in accordance with the normal operating velocity of the system provided in the production process. If, for instance, a robot is to be run in slow motion for testing purposes, the velocities of movement along the coordinate axes are limited to an adjustable percentage of the normal velocity by means of a so-called override generator. Such limitation of the velocity, however, leads to the situation that the resultant path travelled during the motion process differs from the resultant path that would be traveled at normal operating velocity.

SUMMARY OF THE INVENTION

It is an object of the invention to provide an improved method of the type described above such that override velocity changes can be made during the execution of a multi-axis motion of a machine part without thereby changing the resulting motion path relative to the resulting motion path that the machine part would have traveled at the normal operating velocity.

According to the invention, this problem is solved by providing for each drive axis, a distance-time curve at a predetermined operating velocity, corresponding to an override value of 100%, between selected points in space and determining a corresponding instantaneous distance-time curve for the motion of the machine part in synchronism with a time sequence of selected override values for the axis, the distance-time curve being time expanded by an amount that is inversely proportional to the respective override value.

In addition, the rate of change of the override values is limited so as to stay within desired maximum acceleration values to preclude excessive physical stresses on tools and workpieces.

BRIEF DESCRIPTION OF THE DRAWINGS

An embodiment of the invention is shown in the drawings and will be explained in the following section in greater detail.

FIGS. 1 and 2 are velocity-time diagrams for two drive axes;

FIGS. 3 and 4 are corresponding distance-time diagrams;

FIG. 5 shows two resultant motion paths:

DETAILED DESCRIPTION OF THE PREFERRED EMBODIMENT

The solid line in FIG. 1 shows a velocity profile $v=f(t)$ at a normal operating velocity, corresponding to an override value of 100%, for an axis X of a system consisting of two Cartesian drive axes X and Y (for instance, of an automatic drawing board). A dashed line shows the resulting velocity curve for an override value of 50%, such as is appropriate, for instance, for testing purposes. The velocity reduction achieved is provided here in a technically simple manner by first accelerating the X-axis drive in accordance with the velocity curve at 100% override, up to a velocity $v_{x50}$, which corresponds to half the value of the maximum velocity $v_{x100}$ during the 100% override operation. This limited velocity $v_{x50}$ is then maintained until the start of a braking operation, which is effected with the same braking deceleration as for the velocity curve for 100% override, thus leading to the same stopping point as the velocity profile for 100% override.

Similarly, the profile of the velocity $v_y$ is shown versus time t for an override value of 100% as well as for an override value of 50%, the latter case being indicated by a dashed line. The respective maximum values of the velocities $v_y$ are designated here by $v_{y100}$ and $v_{y50}$.

FIG. 3 shows the motion paths resulting from the velocity curves of FIG. 1 by a plot of the distance x traveled along the drive axis X versus time t. Starting from a value 0, the distance traveled reaches a value $x_1$ at the end of the motion path in the case of the 100% override at a time $t=7$, whereas this same location $x_1$ is reached only at a time $t=11$ for an override of 50% (dashed curve).

Similarly, as shown in FIG. 4, the distance y traveled along the drive axis Y at the velocity $v_y$ for 100% override reaches a value $y_1$, corresponding to the end point of the resultant motion path at a time $t=9$, whereas the same location $y_1$ is reached only at a time $t=12$ for 50% override (dashed curve).

The diagram of FIG. 5 compares the respective paths, at 100% and 50% override, resulting from movement along the axes of the Cartesian system for the distances x and y, which paths always begin at a point $P_0$ and end at a point $P_1$ with the coordinate values $x_1$ and $y_1$. It is found that the resulting motion path for an override of 100%, as is indicated by the solid line, deviates considerably from that path which results from an override of 50% (shown dashed).

This variance leads to errors in process observations because the respective velocities are limited at reduced override values, but the velocity profile for 100% override is not limited.

Figure 6:
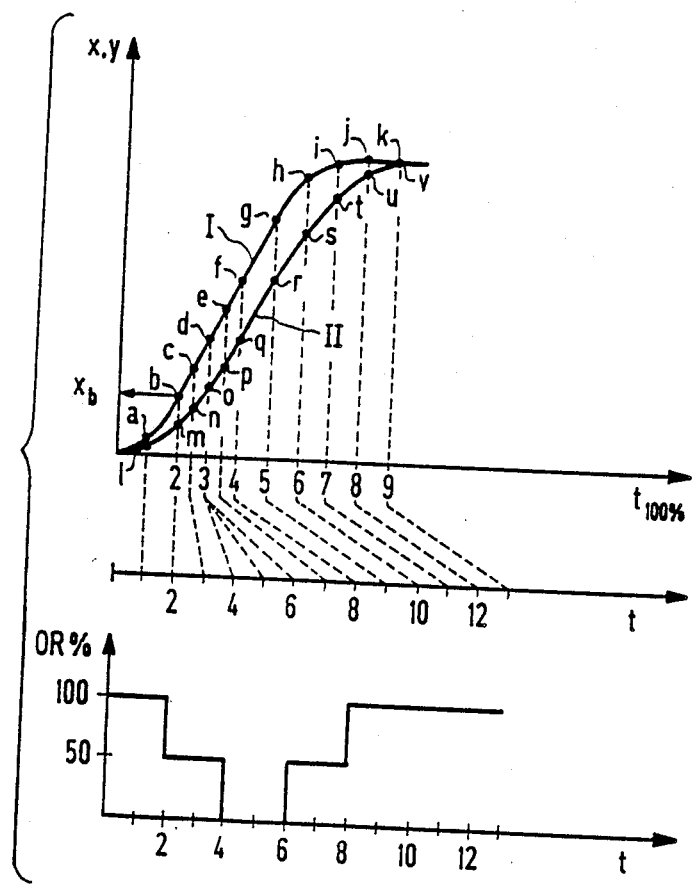
FIG. 6 is a diagram illustrating the method according to the invention.

Here, the present invention takes effect, and FIG. 6 shows how the corresponding distances x and y of movement along the drive axes X and Y are determined for the times t subsequent to the time $t=0$ and up to $t=13$.

In this connection, the lower part of FIG. 6 shows an override sequence which, from time $t=0$ to a time $t=2$, exhibits an override value of 100%. This value is then reduced during a time $t=2$ to $t=4$ to 50% override; from time $t=4$ up to time $t=6$ the override value drops to zero (no motion); this is followed again by an override value of 50% up to a time t=8; whereupon an override value of 100% is applied again up to a time t=13.

In the upper part of FIG. 6, the distance-time curves of the respective distances x and y are shown for an override of 100% for the axes X (curve I) and Y (curve II) in a time raster $t_{100\%}$. The designation $t_{100\%}$ is to indicate that this time $t_{100\%}$ is a waveform at 100% override. The time rasters for t and $t_{100\%}$ would coincide only in this case. The actually elapsed time t of operation with override such as is shown in the lower part of FIG. 6, is shown once more for the sake of clarity by a reference time vector in the middle part of FIG. 6. Dashed lines connect points on this reference vector to corresponding points on the time axis of the upper part of FIG. 6 and then lead to intersections a to k with the curve I and to intersections l to v with the curve II. The distances x for the X axis, related during the times t=1 and t=2 to the points a and b are taken from the curve I, and the distances y for the Y axis related during the same period to the points l and m, are taken from the curve II. This is shown graphically by an arrow for the distance $x_b$ corresponding to the time t=2.

During the following two time intervals, i.e., at the times t=3 and t=4, the override for both X-axis and Y-axis drives is 50%. Consequently, the distance-time curve prepared for $t_{100\%}$ is sampled with a step width reduced to 50%. Therefore, the distance x is chosen for the X axis at the time t=3, which corresponds to the point c on the curve I, while the distance y is chosen for the Y axis which corresponds to the point n. For the time t=4, the points d and o of the curves I and II are evaluated.

Since the system movement stops from t=4 to t=6, the distances related to the points d and o continue to be maintained also during the times t=5 and t=6. Restarting the system at time t=6 with an override value of 50% results at the time t=7 in points e and p respectively, of the curves I and II. These points, for an override value of continuously 100%, would correspond to a time $t_{100\%}=3.5$. At the time t=8, the points f and g are evaluated, whereupon the step width with which the curves I and II are sampled is increased again, because then the override value is increased again to 100%. From this, the points g to k and r to v are obtained.

The sampling of the stored curves according to the preset override value can be formulated mathematically as follows:

Internally to the control, a system time $\tau$ is kept, referred to which every set of motions is prepared in the form of a vectorial function $f(\tau)$. This function $f(\tau)$ describes the motion for a 100% override. During the processing of the set, the function $f(\tau)$ is evaluated once per interpolation cycle. From one interpolation cycle to the next, the system time, for 100% override, must be increased by the clock time $t_{IPO}$. If the run is made with an arbitrary override c.100% the cycle time is weighted with c; i.e., $c.t_{IPO}$ time units are added (thus, 0.8 $t_{IPO}$ for an 80% override).

Formulated in another way: if $\tau_1$ designates the system time and $c_1$ the override to the $i^{th}$ interpolation cycle, one writes generally $$\tau_{i+1} = \tau_i + c_1 \times t_{IPO}$$

and evaluates $f(\tau_{i+1})$.

In a continuous approximation, the robot motion can be represented with t as the external global time by $$f(\tau(t)), \tau(t) = \int_0^t c(t')dt'.$$

The matching of the actual override c(t) to the reference override is accomplished by means of an override control which limits override changes in such a manner that the maximum permissible axis accelerations are not exceeded.

Figure 7:
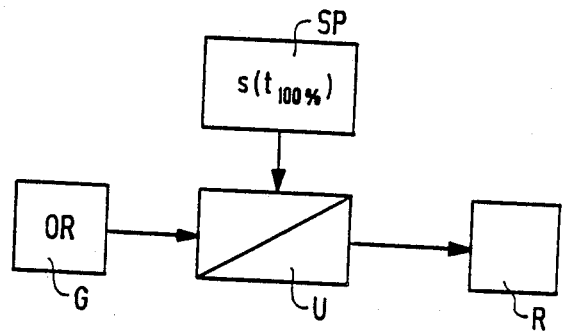
FIG. 7 is a block diagram of a device for performing the method of the invention.

FIG. 7 is a block diagram which shows the structure of a control which can operate according to the method of the invention. Here, the respective position is given in a memory SP for each of the relevant axes, the respective position in connection with a time $t_{100\%}$ being seen for 100% override. This information can be given directly or via parameters of a function algorithm. Furthermore, a converter U is acted upon by a generator G for override values OR between 0 and 100%. The generator G also has available the values of the memory SP. (The rate of change of the override values can be matched here to the possible acceleration of the tool and the workpiece.) The converter U determines, according to the respective override value, the step width in which the curves present in the memory SP are sampled. The resulting values are fed to the path control proper, for instance, of a robot control R.

We claim:

1. A method for controlling a resultant motion of movements along a plurality of coordinate axes of a machine element between two points in space in accordance with selectively variable override values, each override value corresponding to a ratio, expressed as a percentage, of the desired velocity of movement of the machine element to a predetermined operating velocity, wherein the improvement comprises:
    predetermining for each axis a distance-time curve at the normal operating velocity, corresponding to an override value of 100%, between the points in space, and
    determining an instantaneous distance-time curve for moving the machine part so as to establish, in synchronism with a time sequence of selectively varied override values for each axis, a time expansion of the predetermined distance-time curve that is inversely proportional to the respective override value.

2. A method according to claim 1, wherein the rate of change of the selectively variable override values is limited in accordance with predetermined acceleration limits.

* * * * *